United States Patent [19]

Petrie

[11] Patent Number: 5,760,769
[45] Date of Patent: Jun. 2, 1998

[54] APPARATUS AND METHOD FOR IDENTIFYING A SHARED APPLICATION PROGRAM IN A COMPUTER DURING TELECONFERENCING

[75] Inventor: Tracy C. Petrie, Hillsboro, Oreg.

[73] Assignee: Intel Corporation, Santa Clara, Calif.

[21] Appl. No.: 577,705

[22] Filed: Dec. 22, 1995

[51] Int. Cl.$^6$ .................................................. G06F 15/163
[52] U.S. Cl. ..................... 345/334; 345/343; 395/200.35
[58] Field of Search ........................ 395/330, 331, 395/332, 333, 334, 343, 344, 345, 200.34, 200.35; 345/333, 334, 343

[56] References Cited

U.S. PATENT DOCUMENTS

| | | | |
|---|---|---|---|
| 5,386,505 | 1/1995 | Beattie et al. | 345/343 |
| 5,388,202 | 2/1995 | Squires et al. | 345/334 |
| 5,659,694 | 8/1997 | Bibayan . | |

*Primary Examiner*—Robert B. Harrell
*Assistant Examiner*—Kenneth R. Coulter
*Attorney, Agent, or Firm*—Blakely, Sokoloff, Taylor & Zafman

[57] ABSTRACT

A computer-implemented method of identifying an application program running on a host computer and shared by a remote computer during teleconferencing includes the step of determining when the application program is being shared by the remote computer. The application program, when being executed, includes a window displayed on a display of the host computer. If the application program is determined to be shared by the remote computer, then a framing window is created on the display that wraps around the window to identify sharing of the application program by the remote computer. A computer-implemented method of framing a window of an application program running on a computer is also described. An apparatus that includes a computer executable program stored on a storage medium that performs one of the above-described methods is also described.

6 Claims, 10 Drawing Sheets

5,760,769

APPARATUS AND METHOD FOR IDENTIFYING A SHARED APPLICATION PROGRAM IN A COMPUTER DURING TELECONFERENCING

FIELD OF THE INVENTION

The present invention pertains to the field of telecommunications. More particularly, this invention relates to an apparatus and a method for identifying a shared application program in a computer during teleconferencing.

BACKGROUND OF THE INVENTION

Advances in computer and telecommunications technologies have allowed for teleconferencing to occur between computer systems via a communication network. The teleconferencing typically involves transmitting audio, video, and text data simultaneously across the communication network. The text data typically includes documents, graphics, animation, 3-dimensional objects, and movies, etc. In addition, the teleconferencing also involves sharing an application program between the computer systems during teleconferencing.

Sharing an application program between two computer systems during teleconferencing typically means that the application program which is stored in one of the computer systems is simultaneously "run" on both computer systems (i.e., shared by the two computer systems) through teleconferencing. This typically allows one of the computer systems that does not physically store the application program to still be able to use the functions provided by the application program. In other words, this technique allows two (or more) users using linked computer systems through teleconferencing to interact with an application program that is only running on one of the linked computers. Currently, there are many prior art application program sharing technologies that allow application programs to be shared through teleconferencing.

Disadvantages are, however, associated with such prior art application program sharing system. One disadvantage associated is that it is typically relatively difficult to distinguish a shared application program from an unshared application program on a computer. In the case of a single application (which is being shared), it is difficult to distinguish between the shared and unshared states. In the case of multiple running applications, it is difficult to distinguish between shared and unshared applications. This is typically due to the fact that the user interface on the computer is too insignificant to be noticed by average users. Another disadvantage is that the method of distinguishing an application that is being shared by the host computer is different from the method of distinguishing an application that has been shared on the system that is not actually running the shared application (i.e., the guest or remote computer). The window displayed on the host computer is created by the application being shared. This window is typically referred to as the shared application's main window or simply as the main window or shared window. The terms are interchangeably used hereinafter. The window displayed on the guest computer is created by the application sharing system and is typically referred to as the guest window of the shared application program.

SUMMARY OF THE INVENTION

One of the features of the present invention is to allow a window of an application program running on a host computer and shared by a remote computer to be identified during teleconferencing.

Another feature of the present invention is to allow a window of an application program running on a computer to be framed by another window on a display of the computer.

A further feature of the present invention is to create a framing window behind a window of an application program running on a computer such that the window of the application program is framed by the framing window.

A still further feature of the present invention is to allow windows that currently appear differently (i.e., a main window of a shared application program along the host side and a guest window of the shared application along the guest side) to look similar.

A computer-implemented method of distinguishing a shared window (i.e., the main window) of a shared application program from an unshared window of an unshared application running on a host computer includes the step of determining when the shared application program is being shared to a remote computer. The shared application program includes the shared window displayed on a display of the host computer. If the shared application program is determined to be shared to the remote computer, then a framing window is created on the display of the host computer that wraps around the shared window to distinguish the shared window from the unshared window.

A computer-implemented method of framing a window of an application program running on a computer includes the step of determining if the window of the application program needs to be framed. If the window of the application program needs to be framed, then a framing window that is larger in size than the window of the application program is created. The window of the application program is displayed together with the framing window on a display of the computer in a manner that the framing window is displayed behind the window of the application program such that the window of the application program is framed.

An apparatus that includes a computer executable program stored on a storage medium that, when executed in a computer, performs one of the above-described methods.

A computer system includes a memory that stores an application program. The computer system also includes a display and a processor that executes the application program. When the application program is being shared to a remote computer system during teleconferencing with the computer system, the shared application program creates its normal window (i.e., the main window) on the display of the host computer system and an application sharing system of the computer system causes a guest window of the application program to be created on a display of the remote computer system. When it is determined that the application program is being shared to the remote computer system, the processor creates a framing window that, when displayed on the display of the computer system, wraps around the shared application's window to distinguish the shared application's window from an unshared application's window within the computer system.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
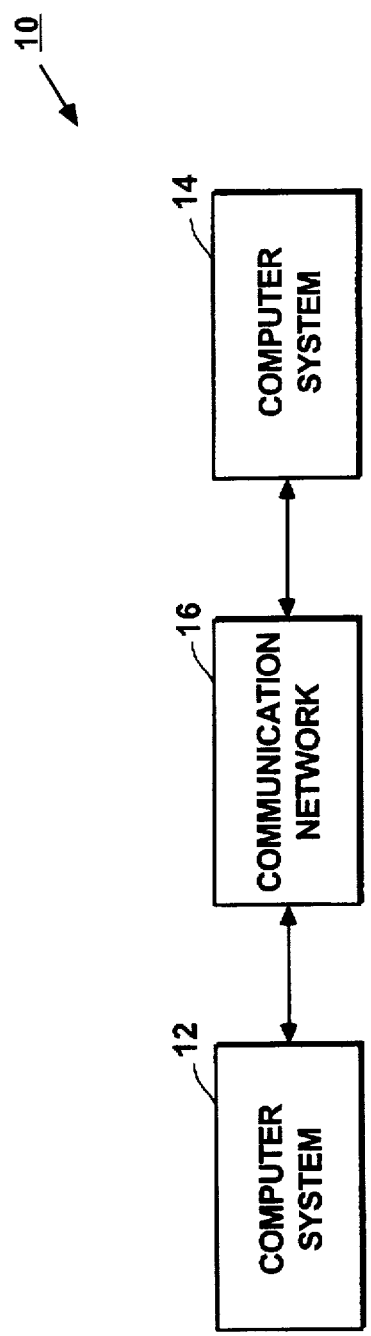
FIG. 1 shows a telecommunication system for teleconferencing, wherein the telecommunication system includes two computer systems connected together via a communication network.

FIG. 1 illustrates a telecommunication system 10 that is capable of conducting teleconferencing. Telecommunication system 10 includes an window framing system (shown in FIGS. 4–10) for allowing a main window of a shared application to be distinguished from a window of an unshared application program during teleconferencing in accordance with one embodiment of the present invention. In addition, the window framing system also frames a guest window of the shared application program on a remote computer system of telecommunication system 10 to distinguish the guest window from a window of an unshared application on the remote computer system of system 10 during teleconferencing. The window framing system will be described in more detail below, also in conjunction with FIGS. 2–10.

As will be described in more detail below, the window framing system is employed in the host computer system to determine if the running application program on the host computer system is being shared by the remote computer system. If the application program is determined to be shared by the remote computer system, then the window framing system creates a framing window behind the main window of the shared application program (i.e., the shared window). The framing window created is larger in size than the shared window such that it wraps around the shared window to distinguish the shared window from a window of an unshared application.

In addition, through an application sharing system that allows sharing of the application program, the window framing system also causes a framing window to be created on the remote computer to frame a guest window of the shared application program on the remote computer. This distinguishes the guest window of the shared application program on the remote computer from windows of other unshared application programs running on the remote computer.

Figure 2:
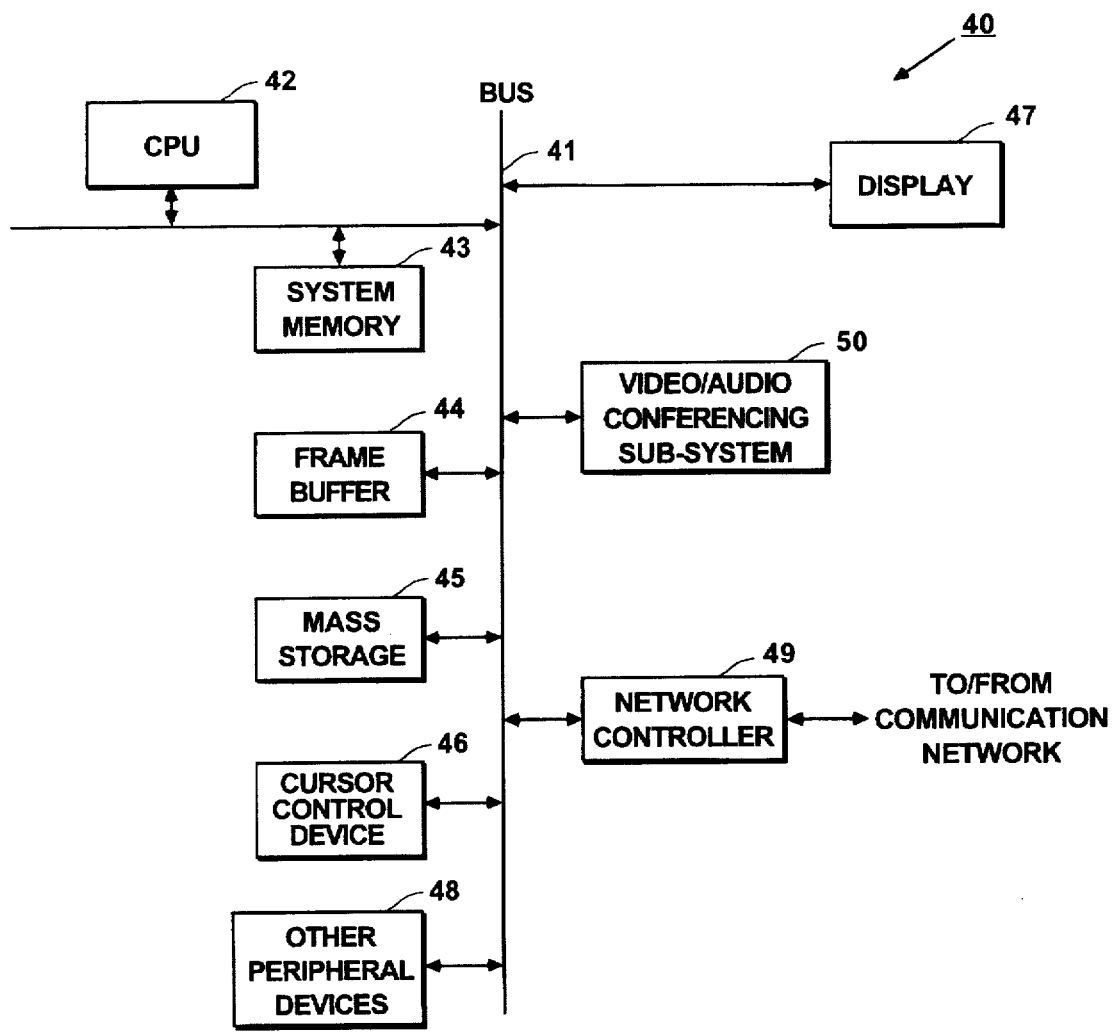
FIG. 2 shows the configuration of each of the computer systems of FIG. 1 that includes a video/audio conferencing sub-system and a network controller.

Referring to FIG. 1, telecommunication system 10 includes two computer systems 12 and 14 connected together for teleconferencing via a communication network 16. Each of computer systems 12 and 14 is equipped with teleconferencing abilities, including the video conferencing ability. FIG. 2 shows in more detail the structure of each of computer systems 12 and 14, which will be described in more detail below.

Referring again to FIG. 1, for one embodiment, each of computer systems 12 and 14 is a personal computer system. Alternatively, each of computer systems 12 and 14 can be other type of computer system. For example, each of computer systems 12 and 14 can be a laptop computer system, a notebook computer system, a personal or digital assistant computer system (i.e., palmtop computer), a workstation computer system, or any other type of computer system.

Communication network 16 can be any known network system. For one embodiment, communication network 16 is an ISDN ("Integrated Services Digital Network") network. Alternatively, communication network 16 can be other type of communication network. For example, communication network 16 can be a simple public telephone network, an FDDI ("Fiber Distributed Data Interface") network, an LAN ("Local Area Network") network, or a WAN ("Wide Area Network") network.

Telecommunication system 10 provides real time teleconferencing between computer systems 12 and 14 via communication network 16. In addition, each of computer systems 12 and 14 is equipped with application sharing capability. This allows each of computer systems 12 and 14 to share a running application program stored in one of systems 12 and 14 via teleconferencing. The window created for the running application can be displayed on the display of each of systems 12 and 14 since the application is shared through teleconferencing.

FIG. 2 shows the structure of a computer system 40 that can be any one of computer systems 12 and 14 of FIG. 1. System 40 operates in multimedia environment and supports integrated digital media, three-dimensional graphics and models, and video. In addition, computer system 40 is also equipped with a video/audio conferencing sub-system 50, which will be described in more detail below.

As can be seen from FIG. 2, system 40 includes a central processing unit ("CPU") 42 connected to a bus 41. CPU 42 can include a microprocessor. For one embodiment, CPU 42 includes an x86 family microprocessor manufactured and sold by Intel Corporation of Santa Clara, Calif.

Bus 41 can be any kind of known bus system. For one embodiment, bus 41 is a peripheral component interconnect ("PCI") bus system. Alternatively, bus 41 can be an ISA (Industry Standard Architecture) bus system, an EISA (Extended ISA) bus system, or a Micro Channel bus system.

Computer system 40 also includes a system memory 43 connected to bus 41. System memory 43 is used in system 40 to store instructions and data to be executed by CPU 42. System memory 43 may include RAM (Random Access Memory), ROM (Read Only Memory), SRAM (Static RAM), DRAM (Dynamic RAM), and/or flash EPROM (flash Erasable and electrically Programmable Read Only Memory). System 40 also includes a frame buffer 44 for storing pixel data or bit-mapped image data for rendering images on a display 47 of system 40 or to be printed by a printer of system 40. Frame buffer 44 can be configured, for example, by DRAM.

System 40 also includes a mass storage device 45, such as a hard disk, and a cursor control device 46. Cursor control device 46 is used in system 40 to permit a user to selectively position a cursor at any desired location on display 47. In addition, cursor control device 46 allows the user to select various command modes, input control signals, and make annotations on display 47. Cursor control device 46 can be implemented by any known cursor control device. Display 47 displays the commands, selections, and status data of an application program running in system 40.

System 40 also includes other peripheral devices 48 connected to bus 41. Other peripheral devices 48 may include a printer, a floppy disk, and a fax/modem (modulation/demodulation), etc.

Video/Audio conferencing subsystem 50 includes a graphics/video processor (not shown) and a video camera (also not shown). The graphics/video processor processes video data captured by the video camera. The graphics/video processor also processes graphics data to be displayed on display 47. Conferencing system 50 also includes audio devices (not shown) that capture and play back voice messages. The graphics/video processor, the video camera, and the audio devices can all be implemented by known devices or circuits.

System 40 also includes a network controller 49 connected between bus 41 and external communication network 16 (see FIG. 1). Network controller 49 is used to connect system 40 to communication network 16 (see FIG. 1) for network communications. Network controller 49 can be any known network controller. In addition, the necessary circuitry of network controller 49 may vary, depending on the type of external network 16 to which computer system 40 is connected. For example, if communication network 16 is the ISDN network, then network controller 49 is an ISDN network controller.

Moreover, each of components 41 through 50 of system 40 includes a device driver (not shown in FIG. 2) to drive the individual component. Device drivers are used to translate program and operating system demands into language understood by hardware components 41–50 of system 40. For example, display 47 has a display driver and cursor control device 46 has a cursor control device driver. Each of the device drivers for system 40 is a known device driver.

Figure 3:
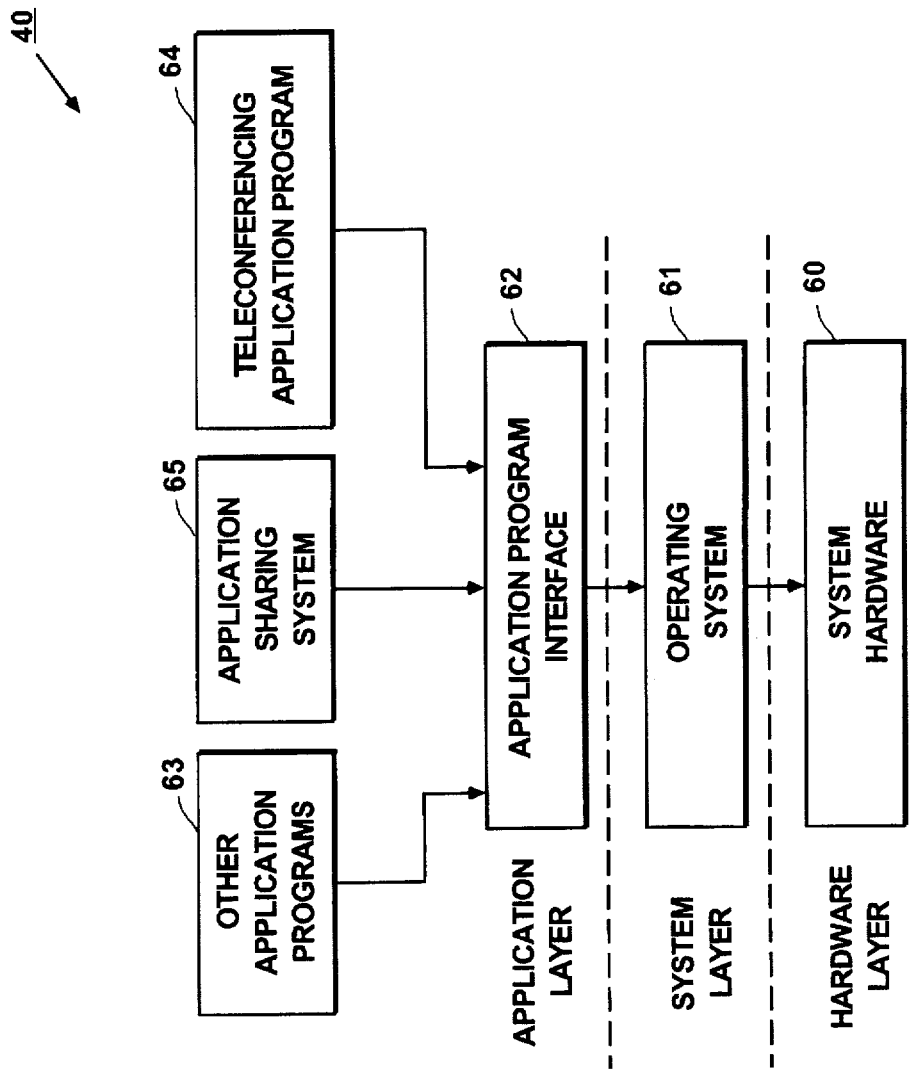
FIG. 3 shows different layers of hardware and software of the computer system of FIG. 2.

In addition to the hardware shown in FIG. 2, computer system 40 also includes an operating system and application programs. FIG. 3 shows system 40 arranged in different layers with respect to the software of system 40.

As can be seen from FIG. 3, system 40 includes a hardware layer comprising system hardware 60. System hardware 60 of FIG. 3 represents components 41 through 50 shown in FIG. 2. As can be seen from FIG. 3, system 40 also has a system layer that includes an operating system 61. Operating system 61 can be any known operating system that supports multi-media, networking, and teleconferencing functions.

For one embodiment, operating system 61 is a Microsoft Windows™ family operating system (e.g., WINDOWS 3.1, WINDOWS NT, or WINDOWS 95) sold by Microsoft Corporation of Redmond, Wash. Alternatively, operating system 61 can be any other known operating system with a graphical window user interface. For example, operating system 61 can be an OS-2™ operating system sold by IBM Corporation of Armonk, N.Y.

System 40 also includes an application layer interfacing with the system layer. The application layer includes an application program interface 62, a teleconferencing application program 64, and other application programs 63. Application program interface 62 is used to interface the application programs of system 40 with operating system 61. Application program interface 62 allows an application program to interface with operating system 61 and request services from operating system 61. Application program interface 62 can be any known application program interface. Application program interface 62 typically includes a graphics application program interface, a video application program interface, and an audio application program interface (all are not shown).

For one embodiment, teleconferencing application program 64 is a ProShare™ teleconferencing application program sold by Intel Corporation. Alternatively, teleconferencing application program 64 can be other known teleconferencing application program.

In accordance with one embodiment of the present invention, the application layer of system 40 includes an application sharing system 65. Application sharing system 65 is implemented to allow an application program to be shared by two or more computers linked together through teleconferencing. The window of the shared application program is displayed on the display of each of the two computer systems (for example, systems 12 and 14 of FIG. 1) during teleconferencing. This typically results in two identical windows to be created and displayed for the shared application, one being displayed on the display of the host computer and the other being displayed on the display of the guest or remote computer. As described above, the window of the shared application program displayed on the host computer is referred to as the shared window or the main window of the shared application program and the window of the shared application program displayed on the guest or remote computer is referred to as the guest window of the shared application program.

In order for the shared window of the shared application program to be distinguished from a window of an unshared application program, application sharing system 65 includes a window framing system 73 (shown in FIG. 4) that implements one embodiment of the present invention. The window framing system 73 of the present invention creates a framing window behind the shared window of the shared application program such that the shared window of the shared application program is framed by the framing window to distinguish from the window of an unshared application program on the host computer. This is done by defining positions of the framing window with respect to the shared window. As is known, in Microsoft Windows environment, a window typically has a Z order (i.e., in the direction perpendicular to the screen of the display) in addition to X and Y positions. The Z order of a window typically determines the "behindness" of the window with respect to other windows that are also displayed on the display. In other words, the Z order determines which window is displayed frontmost on the display.

In addition, computer system 40 may also function as the guest or remote computer system of the shared application during teleconferencing. When this occurs, a guest window of the shared application is displayed on system 40, instead of the main window of the shared application program. In this case, in order for the guest window of the shared application to be distinguished from windows of unshared application programs, window framing system 73 also creates the framing window behind the guest window of the shared application program to frame the guest window. This thus distinguishes the guest window of the shared application program from windows of unshared applications when computer system 40 functions as the guest or remote computer system of the shared application program. The window framing system in accordance with one embodiment of the present invention will be described in more detail below, in conjunction with FIG. 4.

Figure 4:
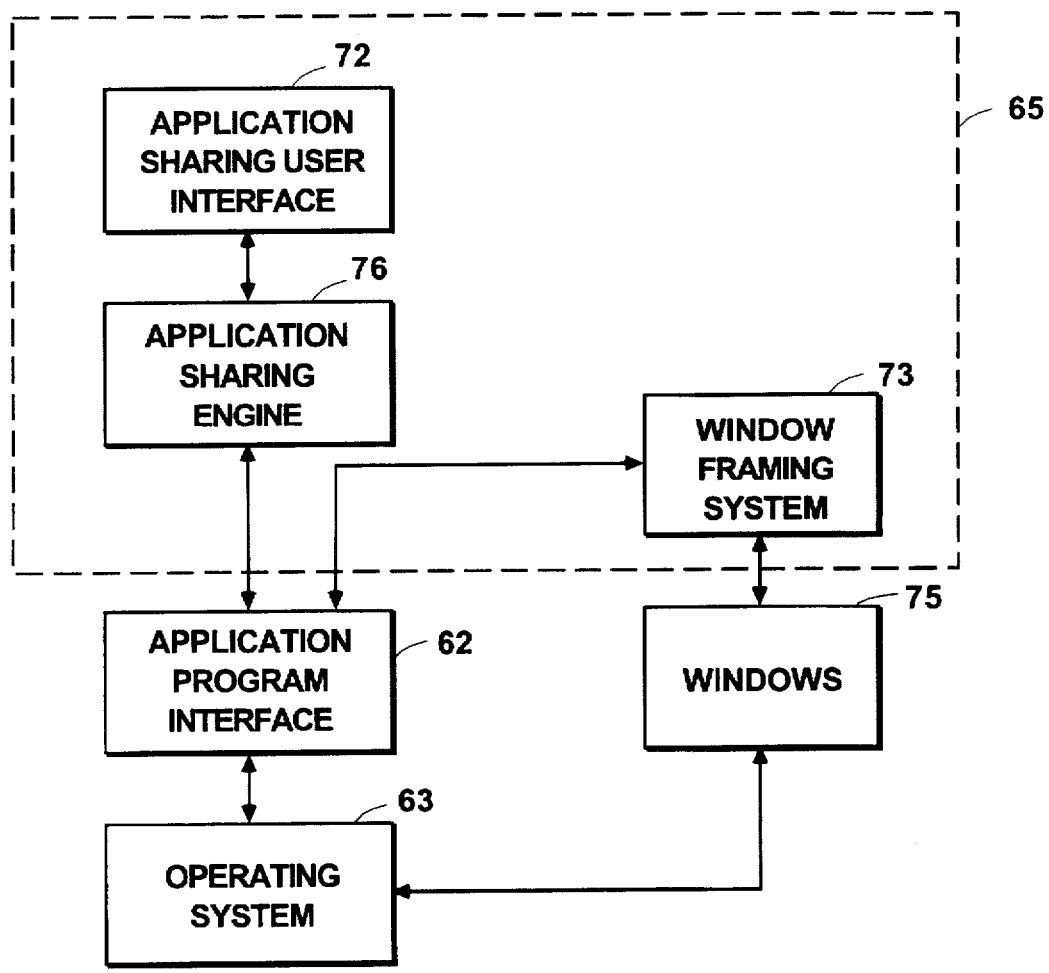
FIG. 4 is another block diagram showing an application sharing system in the computer system of FIG. 3, wherein the application sharing system includes a window framing system in accordance with one embodiment of the present invention.

As can be seen from FIG. 4, application sharing system 65 includes an application sharing engine 76, an application sharing user interface 72, and the window framing system 73. Application sharing user interface 72 interfaces with application sharing engine 76. Application sharing engine 76 and application sharing user interface 72 can all be implemented by known software and/or hardware means. Their functions will be described briefly below.

Application sharing user interface 72 allows an application program of other application programs 63 (FIG. 3) in system 40 to be shared by the user of a remote computer system through application sharing engine 76. For example, application sharing user interface 72 allows the user of the remote computer system to run and share an application program (such as the Word Perfect program sold by Word Perfect Corporation (now owned by IBM Corporation) or the Microsoft Word program sold by Microsoft Corporation) stored in system 40 during teleconferencing if the remote computer system does not have that application program such as Word Perfect or Microsoft Word stored in it. Again, application sharing user interface 72 can be any known application sharing user interface software. Application sharing engine 76 can be any known application sharing engine software.

Application sharing engine 76 interfaces with operating system 61 via application program interface 62. Window framing system 73 handles the tasks of (1) detecting if the running application is being shared by the remote computer, and (2), if so, linking a framing window routine that generates a framing window (i.e., framing window 101 of FIGS. 5–6) with the window creation routine that generates the shared window (i.e., window 102 of FIGS. 5–6) of the shared application program such that the framing window is created and displayed behind the shared window of the shared application program. In doing so, the shared window of the shared application program is distinguished from the window of an unshared application program that is also displayed on the host computer.

In addition, when the computer system within which window framing system 73 is installed functions as a guest or remote computer of a shared application, window framing system 73 handles the tasks of (1) detecting through application sharing user interface 72 and application sharing engine 73 if a window displayed is a guest window of a shared application, and (2), if so, linking the framing window routine with the guest window creation routine that generates the guest window of the shared application program such that the guest window of the shared application is distinguished from windows of unshared application programs that are displayed on the remote computer.

Figure 5:
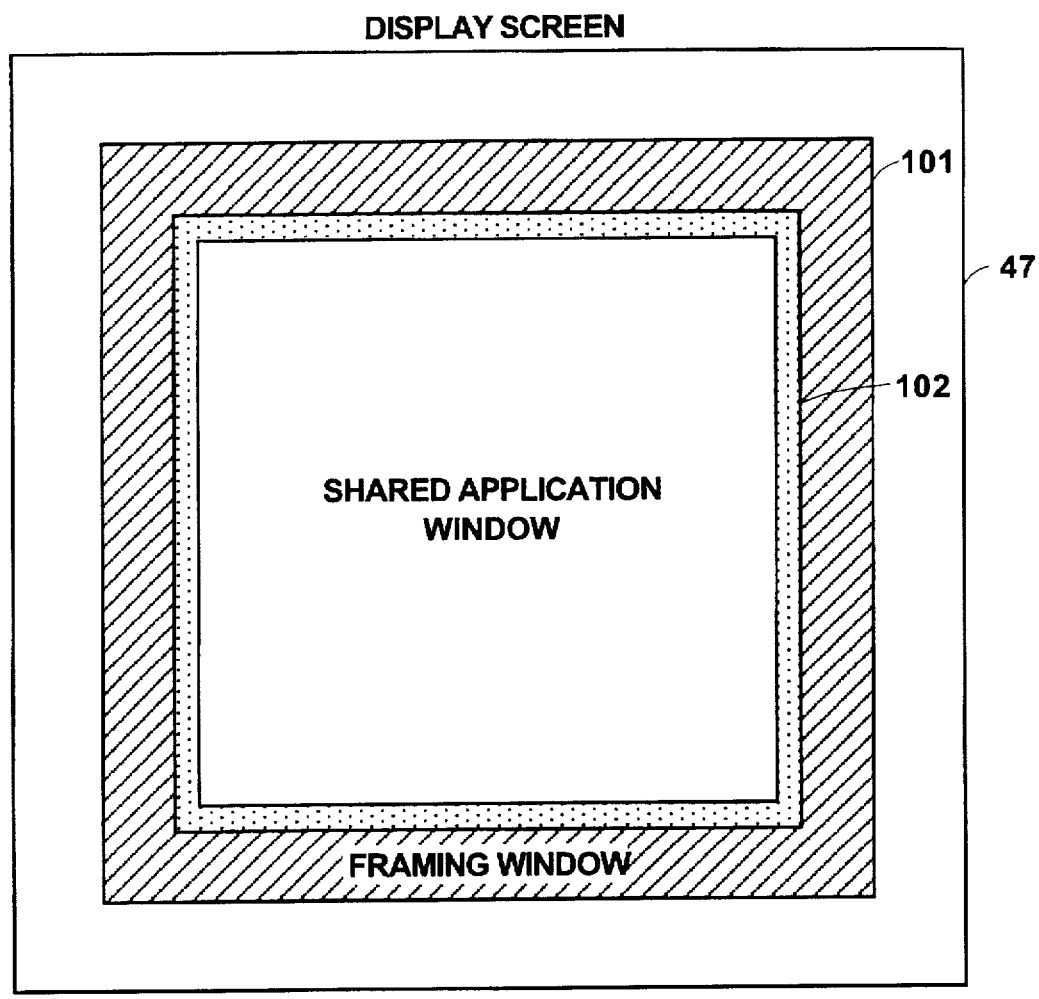
FIG. 5 shows the main window of a shared application program being framed by a framing window generated by the window framing system of FIG. 4.
Figure 6:
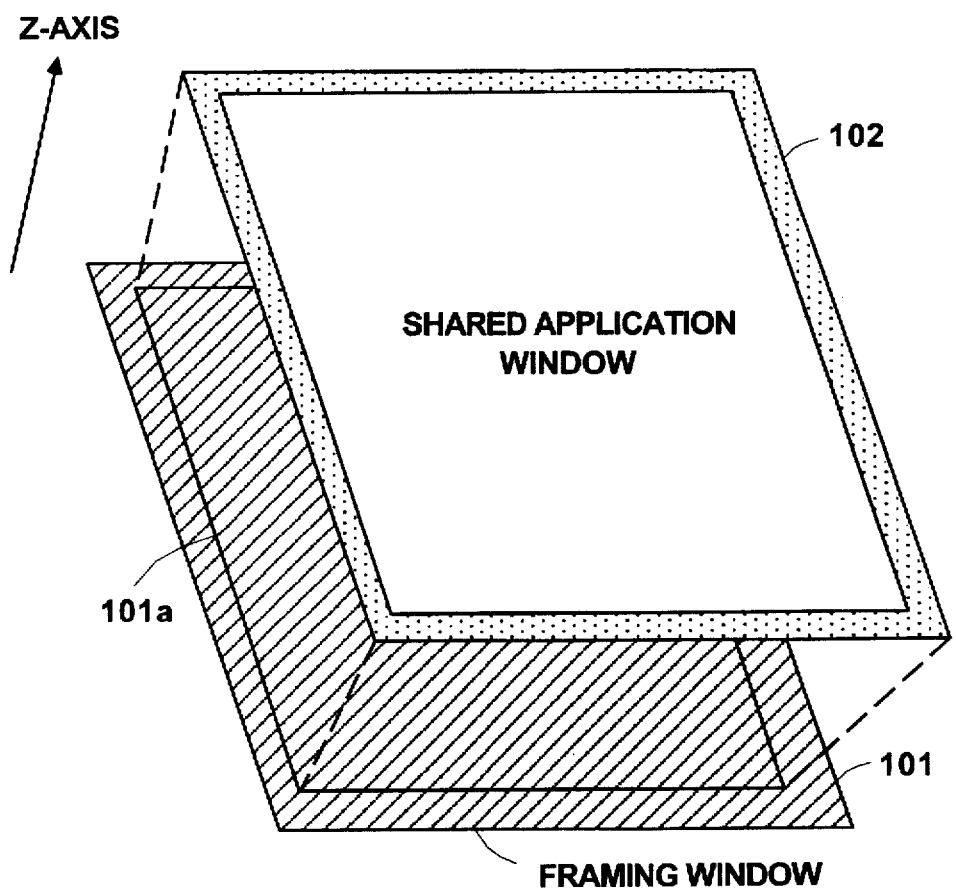
FIG. 6 shows the main window of the shared application program and the framing window of FIG. 5 along Z-axis.

In addition, window framing system 73 tracks the shared window or the guest window of the shared application program by tracking the position, size, and display messages of the shared window or the guest window such that the framing window can be created to frame the shared window or the guest window of the shared application. Moreover, window framing system 73 also detects if a user message for displaying the framing window in front of the shared window or the guest window of the shared application program is received. If so, window framing system 73 ignores the message such that the framing window remains behind the shared window or the guest window of the shared application program. FIGS. 5 and 6 show how framing window 101 is displayed along with shared application window 102 on display 47 of computer 40 (FIG. 2). As described above, shared application window 102 can be either the main window (i.e., the shared window or the guest window of the shared application program. Alternatively, window framing system 73 of FIG. 4 can create a framing window to frame any window of a running application program. In this case, window 102 can simply be the window of that running application program. FIGS. 7 through 10 show in flow chart diagram form the process of framing the shared window or the guest window of the shared application program by window framing system 73. FIGS. 5–10 will be described in more detail below.

As can be seen from FIGS. 5 and 6, framing window 101 is created and displayed behind shared application window 102. The size of framing window 101 is bigger than that of shared application window 102. Because framing window 101 is displayed behind shared application window 102, portion 101a of framing window 101 is thus covered by shared application window 102 and cannot be viewed. As a result, framing window 101 frames or wraps around shared application window 102.

Figure 7:
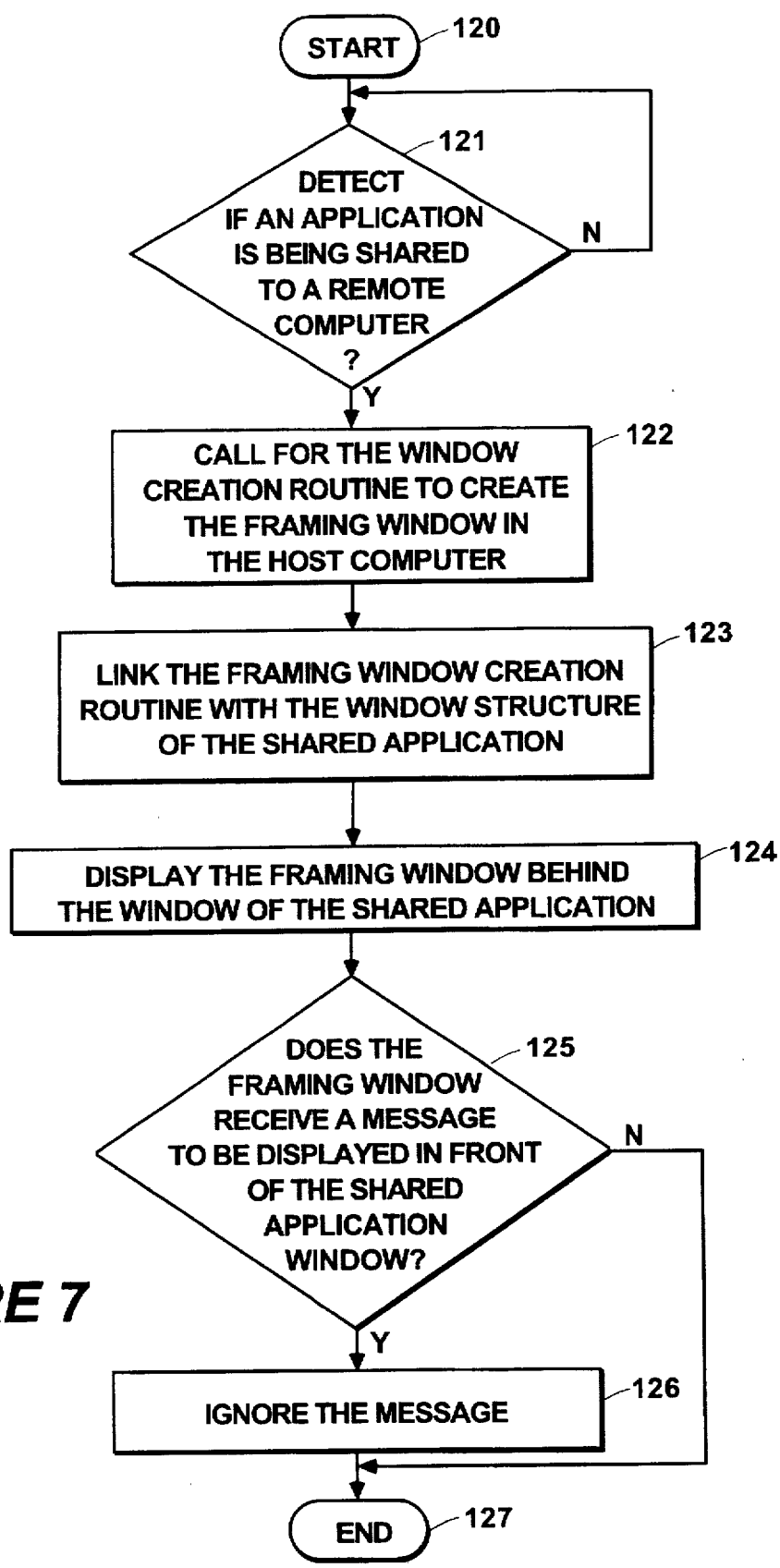
FIG. 7 is a flow chart diagram of the process implemented by the framing window system for creating the framing window to frame the main window of the shared application program.

Referring to FIG. 7, the process starts at step 120. At step 121, window framing system 73 (FIG. 4) of the host computer detects if a running application program is being shared by a remote computer. If the answer is no, then step 121 is repeated. Otherwise, step 122 is performed in which window framing system 73 calls for its window creation routine to create the framing window in the host computer. The window creation routine can be implemented using known Microsoft Windows programming commands. The shading or pattern of the framing window can be preset or predetermined using known Microsoft Windows window creation commands.

Figure 8:
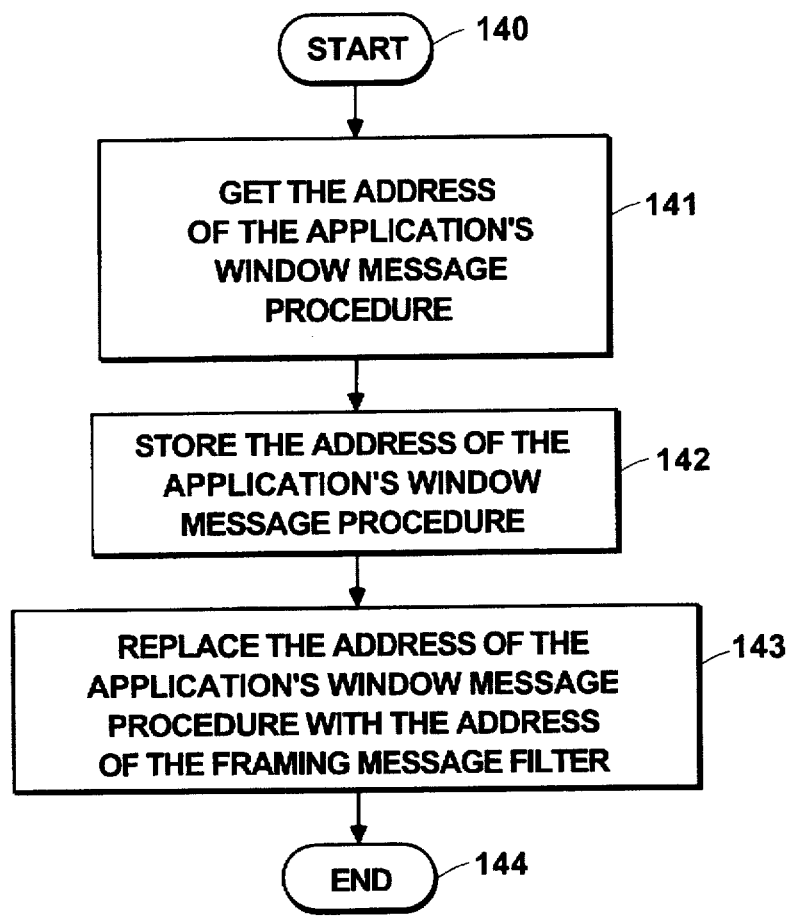
FIGS. 8 and 9 show two different sub-routines of the process of FIG. 7 in accordance with embodiments of the present invention.
Figure 9:
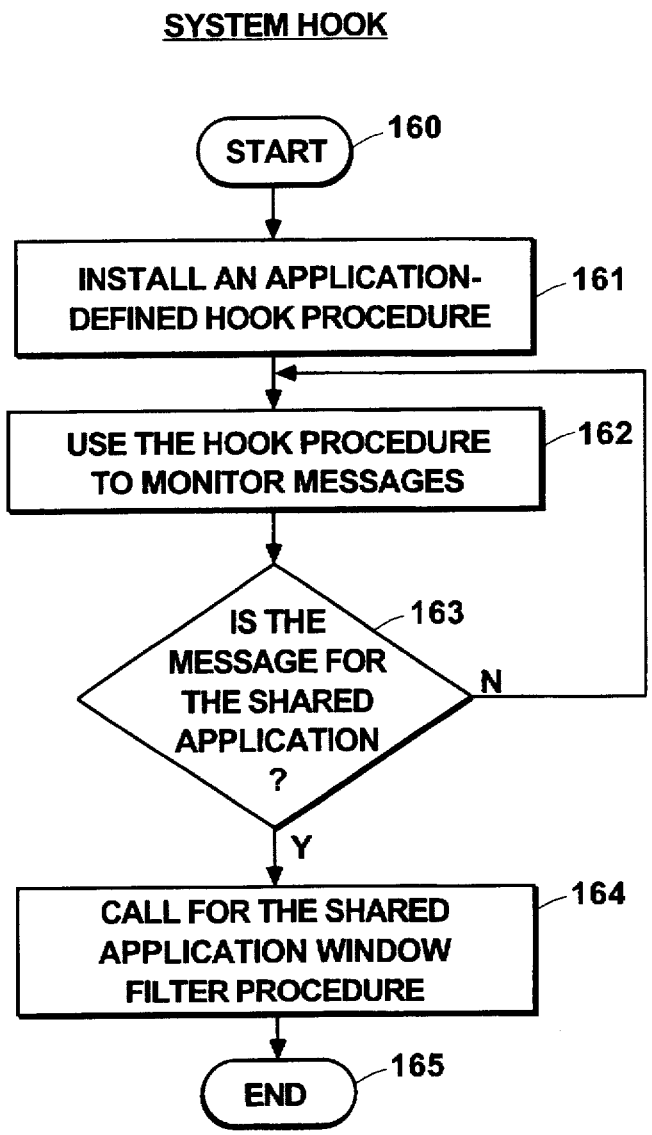

At step 123, the framing window creation routine or procedure is linked with the shared application window structure of the shared application program such that the framing window is displayed behind the shared window and/or the guest window of the shared application. One known technique of accomplishing this step is shown in FIG. 8, which is referred to as Dynamic Subclassing. As is known, subclassing is a well documented method of attaching a procedure into a "chain" of message handlers for a given window. Another known technique of accomplishing the link at step 123 is shown in FIG. 9, which is referred to as System Hook. This technique is also a well documented technique that uses a System Hook via SetWindowsHookEx( ) command to "spy" on windows messages. Both of the above-described techniques will be described in more detail below, in conjunction with FIGS. 8 through 10.

Referring back to FIG. 7, the windows (i.e., the framing window and the shared window or the guest window of the shared application program) are then displayed at step 124. Then step 125 is performed at which window framing system 73 of FIG. 4 determines if the framing window receives a message for display in front of the shared application window. The message may be resulted from the user's accidental placing the cursor on the framing window and activating the cursor control device (i.e., "clicking" on the framing window). As is known, such action typically signals to the framing window that it should be displayed frontmost. However, if the framing window is allowed to be displayed in front of the window (i.e., the shared window or guest window) of the shared application program, the framing window will obscure the window of the shared application. Thus, if the answer is yes at step 125, then step 126 is performed at which window framing system 73 of FIG. 4 ignores the message. Otherwise, step 126 is skipped. The process then ends at step 127.

Referring to FIG. 8, the dynamic subclassing technique of linking the framing window generation procedure with the shared application window is shown. At step 141, the address of the application's window message procedure for generating the shared application window is obtained. At step 142, the address of the application's window message procedure is stored. Then the address of the application's window message procedure is replaced with the address of a framing filter procedure at step 143. Then the process ends at step 144. The framing message filter procedure can be implemented by any known window filter procedure.

Referring to FIG. 9, the system hook technique for accomplishing step 123 of FIG. 7 is shown. At step 161, an application-defined hook procedure is installed in the shared application program. At step 162, the hook procedure is called to monitor messages. At step 163, the hook procedure determines if the message is for the shared application. If not, step 162 is repeated. If so, step 164 is performed at which time the shared application window filter procedure is called for. Then the process ends at step 165.

Figure 10:
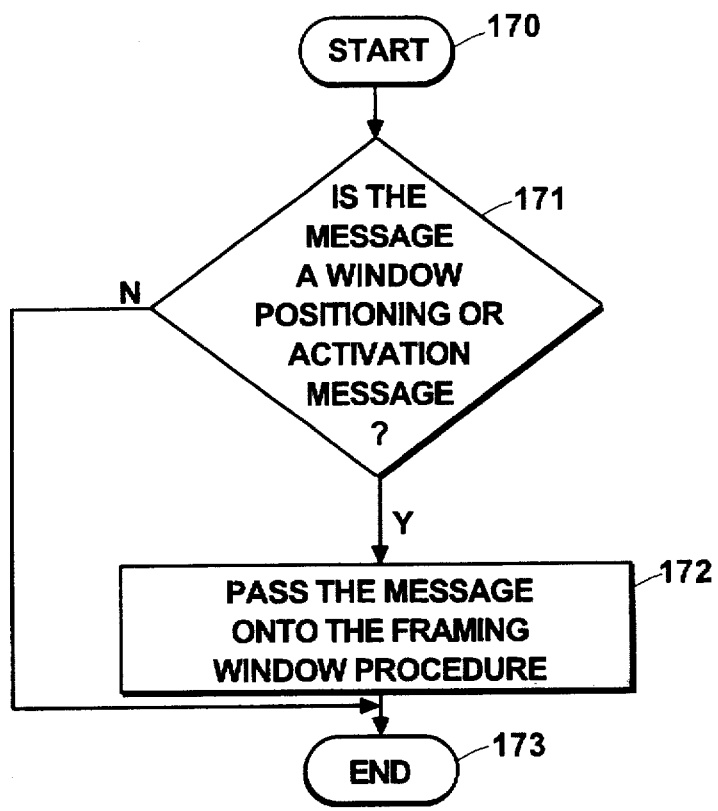
FIG. 10 shows a flow chart of a shared application window filter procedure of the sub-routine of FIG. 9.

Referring to FIG. 10, the flow chart of the shared application window filter procedure is shown. At step 171, the message received is checked to see if it is a window positioning or window activation message (e.g., WM_ACTIVE, WM_MOVE, and WM_SIZE). If so, step 172 is performed at which the message is passed onto the framing window generation procedure. If not, step 172 is bypassed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of distinguishing a shared window of a shared application program running on a host computer and shared to a remote computer, comprising the steps of:
   (A) determining when the shared application program is being shared to the remote computer;
   (B) creating a framed appearance for the shared window to distinguish the shared window when the shared application program is determined to be shared to the remote computer, by displaying and fixing a framing window that is larger than the shared window behind the shared window, such that exposed portions of the framing window provide the framed appearance for the shared window, including,
      (a) determining the location and size of the shared window displayed on the display, and
      (b) positioning the framing window behind and in alignment with the shared window such that portions of the framing window are exposed around the shared window, and appearing as a frame of the shared window;
   (C) determining if a message for displaying the framing window in front of the shared window is received by the framing window; and
   (D) not allowing the framing window to be displayed in front of the shared window when the message is received by the framing window.

2. A computer-implemented method of distinguishing a quest window of a shared application program running on a host computer and shared to a remote computer during teleconferencing comprising the steps of:
   (A) determining when the shared application program is being shared by the remote computer;
   (B) creating a framed appearance for the quest window to distinguish the quest window from the unshared window of the unshared application program when the shared application program is determined to be shared by the remote computer, by displaying and fixing a framing window that is larger than the quest window behind the guest window, such that exposed portions of the framing window provided the framed appearance for the quest window, including,
      (a) determining the location and size of the quest window displayed, and
      (b) positioning the framing window behind and in alignment with the quest window such that portions of the framing window are exposed around the guest window, and appearing as a frame of the quest window;
   (C) determining if a message for displaying the framing window in front of the guest window is received by the framing window; and
   (D) not allowing the framing window to be displayed in front of the guest window when the message is received by the framing window.

3. A computer-implement method of framing a window of an application running on a computer, comprising the steps of:
   (A) determining if the window of the application needs to be framed;
   (B) if the window of the application program needs to be framed, then creating a framing window that is larger in size than the window of the application program, including,
      (a) determining the location and size of the window of the application program displayed, and
      (b) positioning the framing window behind and in alignment with the window of the application program such that portions of the framing window are exposed around the window of the application program, and appearing as a frame of the window of the application program;
   (C) displaying the window of the application program together with the framing window on a display of the computer in a manner that the framing window is displayed and fixed behind the window of the application program such that portions of the framing window are exposed around the window of the application program giving the window of the application program a framed appearance;
   (D) determining if a message for displaying the framing window in front of the window of the application program is received by the framing window; and
   (E) not allowing the framing window to be displayed in front of the window of the application program when the message is received by the framing window.

4. An apparatus, comprising:
   (A) a storage medium;
   (B) a computer executable program stored on the storage medium, the computer executable program, when executed, distinguishing a shared window of a shared application program running on a host computer and shared to a remote computer during teleconferencing, wherein the computer executable program further comprises
      (a) a first set of instructions that determine when the shared application program is shared to the remote computer;
      (b) a second set of instructions that create a framed appearance for the shared window to distinguish the shared window when the shared application program is determined to be shared by the remote computer, by displaying and fixing a framing window that is larger than the shared window behind the shared window, such that exposed portions of the framing window create a framed appearance for the shared window, wherein the second set of instructions further comprise (a) a first subset of the second set of instructions that determine the location and size of the shared window displayed on the display;

(b) a second subset of the second set of instructions that position the framing window behind and in alignment with the shared window such that portions of the framing window are exposed around the shared window, and appearing as a frame of the shared window;

(c) a third subset of the second set of instructions that determine if a message for displaying the framing window in front of the shared window is received by the framing window; and (d) a fourth subset of the second set of instructions that allow the framing window not to be displayed in front of the shared window when the message is received by the framing window.

5. A computer system, comprising:

(A) a memory that stores an application program;

(B) a processor that executes the application program;

(C) a display, wherein when the application program is being shared by a remote computer system during teleconferencing with the computer system, the application program includes a main window on the display of the computer system, and a quest window on a display of the remote computer system, wherein when the processor determines that the application program is being shared by the remote computer system, the processor creates a framed appearance for the main window to distinguish the main window by displaying and fixing a framing window behind the main window, such that exposed portions of the framing window create a framed appearance for the main window, wherein the processor further (a) determines the location and size of the main window to be displayed on the display;

(b) positions the framing window behind and in alignment with the main window such that portions of the framing window are exposed around the main window, and appearing as a frame of the main window;

(c) determines if a message for displaying the framing window in front of the main window is received by the framing window; and (d) allows the framing window not to be displayed in front of the main window when the message is received by the framing window.

6. An apparatus comprising:

(A) a storage medium;

(B) a computer executable Program stored on the storage medium, the computer executable program, when executed, framing a window of an application program running on a computer, wherein the computer executable program further comprises (i) a first set of instructions that determine if the window of the application program needs to be framed;

(ii) a second set of instructions that create a framing window that is larger in size than the window of the application program if the window of the application program need to be framed, wherein the second set of instructions further comprise (a) a first subset of the of instructions that determine the location and size of the window of the application program to be displayed;

(b) a second subset of the second set of instructions that position the framing window behind and in alignment with the window of the application program such that portions of the framing window are exposed around the window of the application program, and appearing as a frame of the window of the application program;

(c) a third subset of the second set of instructions that determine if a message for displaying the framing window in front of the window of the application program is received by the framing window; and (d) a fourth subset of the second set of instructions that allow the framing window not to be displayed in front of the window of the application program when the message is received by the framing window; and (iii) a third set of instructions that display the window of the application program together with the framing window on a display of the computer in a manner that the framing window is displayed and fixed behind the window of the application program such that exposed portions of the framing window create a framed appearance for the window of the application program.

* * * * *